United States Patent
Zürbig et al.

(10) Patent No.: US 6,852,418 B1
(45) Date of Patent: Feb. 8, 2005

(54) COMPOSITE STRUCTURE WITH ONE OR SEVERAL POLYURETHANE LAYERS, METHOD FOR THEIR MANUFACTURE AND USE THEREOF

(75) Inventors: Claus Zürbig, Hannover (DE); Hans-Hinrich Kruse, Barsinghausen (DE)

(73) Assignee: Benecke-Kaliko AG, Hannover (DE)

( * ) Notice: Subject to any disclaimer, the term of this patent is extended or adjusted under 35 U.S.C. 154(b) by 92 days.

(21) Appl. No.: 09/612,182

(22) Filed: Jul. 7, 2000

(30) Foreign Application Priority Data

Jul. 7, 1999 (DE) ......................... 199 31 323

(51) Int. Cl.⁷ ............................................. B32B 27/40
(52) U.S. Cl. ............................. 428/423.1; 428/423.3; 428/424.6; 428/424.8; 428/904
(58) Field of Search ........................... 428/423.1, 423.3, 428/424.6, 424.8, 904, 423.5, 423.7

(56) References Cited

U.S. PATENT DOCUMENTS

| | | | |
|---|---|---|---|
| 3,816,168 A | * 6/1974 | Lewis et al. | 427/389 |
| 3,943,075 A | * 3/1976 | Fishbein et al. | 521/174 |
| 4,190,694 A | * 2/1980 | Muck et al. | 428/212 |
| 5,156,900 A | * 10/1992 | Nishimura | 428/151 |

FOREIGN PATENT DOCUMENTS

DE    199 21 143 A1    5/1999    ........... B60R/13/04

OTHER PUBLICATIONS

Oertel, Gunter. Polyurethane Handbook, 2$^{nd}$ ed. Hanser Publishers, New York: 1994, pp. 55–65.*

* cited by examiner

Primary Examiner—James J. Seidleck
Assistant Examiner—Melanie Bissett
(74) Attorney, Agent, or Firm—Darby & Darby

(57) ABSTRACT

A composite structure is disclosed. The structure includes one or several polyurethane layers, a support layer, in particular a textile support layer, as well as an optional adhesive layer placed between these layers. The composite structure is characterized in that at least one of the polyurethane layers contains a polyurethane having the formula (I)

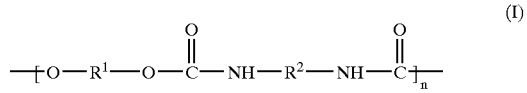

wherein O—R$^1$—O— is the radical of a polyole with primary and/or secondary hydroxyl functional end groups, R$^1$ and R$^2$ independently represent an organic radical which includes aliphatic, cyclo-aliphatic, aromatic and/or heterocyclic groups, and n is an integer number between 1 and 50,000. Also disclosed is a method of manufacturing the composite structure and its use as imitation leather.

15 Claims, No Drawings

COMPOSITE STRUCTURE WITH ONE OR SEVERAL POLYURETHANE LAYERS, METHOD FOR THEIR MANUFACTURE AND USE THEREOF

BACKGROUND OF THE INVENTION

1. Field of the Invention

The present invention relates to a composite structure with one or several polyurethane layers, a method for their manufacture and use of such structure, in particular as imitation leather.

2. Description of the Related Art

Composite structures are structures made of composite materials and obtained by combining different materials, with the chemical, physical and other properties of the composite structures being superior to those of the individual components. Composite materials include, among others, textile composites, fleece, laminated layered materials, i.e., materials having a sandwich structure (e.g., plywood, laminated foils and other laminates) and joined using an adhesive or a lining, as well as imitation leather. Imitation leather is to be understood as a multi-layer flexible composite material which includes a polymer in the surface layer and a support material which can, in particular, be made of textiles, fleece or an expanded material, such as PVC, polyolefine or polyurethane. The polymer cover layer protects against abrasion and impact and determines the visual appearance, whereas the support provides the mechanical strength and elastic properties. Polyurethane is also used as a polymer for coating. A distinction is generally made between single-component and two-component coating systems.

The single-component coating materials are processed in the form of solutions (solid content approximately 20 to 30%) in organic solvents (e.g., DMF, 2-propanol, toluene) or in form of dispersions (solid content approximately 20 to 40%). After spreading, e.g., onto a tape, as described in DE-A4422871, the film is formed by evaporating the solvent in a drying channel. Single-component polyurethane compounds can be cross-linked after deposition by addition of slowly reacting poly-functional cross linking compounds (e.g., aliphatic poly-isocyanates) to improve their properties, for example, their resistance against chemicals. Due to their low solid content, single-component polyurethane coating systems can be applied as thin films.

Two-component coating systems are reactive mixtures made of, for example, functional pre-polymers and cross-linking compounds containing a small fraction of organic solvents (<5 to 10%). Unlike the single component systems, these "high solid systems" polymerize under processing conditions, thereby forming a urethane film. To provide an adequate a pot life (defined as the time period during which a mixture, after all components are mixed together, can still be processed) at room temperature, isocyanate compounds are employed, with the isocyanate end groups being reversibly protected by blocking substances (e.g., 2-butanone-oxime). The chemical reaction proceeds here in two steps. Initially, at temperatures above 140° C., the blocking agent is split off and the free NCO-group is regenerated. In a second step, the isocyanate end group reacts with the chain extender by increasing the molecular weight. The molecular weight of the polymer thereby gradually increases until it reaches the molecular weight of the polyurethane film. Disadvantageously, the selection of blocking isocyanate derivates for this system is relatively limited. Hence, the selection of the educts is rather limited, making it difficult to achieve the desired properties of a product by changing its the composition. As a further disadvantage, the system can attain a high reaction rate only with a long residence time and at high temperatures. This limits the production speed and increases the production costs, which is partly due to the high price of the blocking isocyanate derivates.

It is therefore an object of the present invention to take advantage of the great variety of available and usable educts to produce composite structures with polyurethane layers over a wide range of compositions and a broad spectrum of characteristic properties. It is also a goal to lower the production costs. It is another object of the invention to provide a suitable method for manufacturing the composite structures.

SUMMARY OF THE INVENTION

According to the invention, the object is attained by a composite structure with one or several polyurethane layers; a support layer, in particular a textile support layer or a support layer made of PVC, polyolefine or polyurethane foam, as well as by an optional adhesive layer which may be placed between these layers, wherein at least one of the polyurethane layers contains a polyurethane having the formula

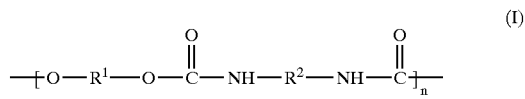

(I)

wherein O—$R^1$—O— is the radical of a polyole with primary and/or secondary hydroxyl functional end groups, $R^1$ and $R^2$ independently represent an organic radical which
  includes aliphatic, cyclo-aliphatic, aromatic and/or heterocyclic groups, and
n is an integer number between 1 and 50,000.

Preferably, two polyurethane layers are provided in the composite structure, wherein the outer and/or the inner polyurethane layer contain a polyurethane of the formula (1).

The polyole which forms the basis of the radical group —O—$R^1$—O— has preferably a molecular weight of approximately 2000 to 12,000, with polyether glycols and/or polyester glycols, in particular poly-(oxypropylene)glycols and/or glycols of dimeric fatty acids being preferred. The ratio between the primary and the secondary hydroxyl functional groups of the polyole is an important parameter for obtaining the end product. Preferably, the primary and secondary hydroxyl functional groups of the polyole have a ratio of approximately 2:1 to 1:6. The polyoles are preferably bi-functional and/or tri-functional polyoles, wherein a ratio of the bi-functional polyole to the tri-functional polyole of approximately 1:2 to 5:1 is particularly preferred. Coatings that are particularly stable both hydrolytically and thermally are attained by using non-polar polyester polyoles.

The diisocyanate compounds on which the radical $R^2$ is based, have an essentially unlimited range. Particularly advantageous is the use of isophoron-diisocyanate, hexamethylene diisocyanate, toluylene diisocyanate and/or diphenylmethane diisocyanate (MDI).

The film properties of the polyurethane coatings are particularly important for the handling properties of the composite materials of the invention. Preferably, the polyurethane coatings containing the polyurethane according to formula (I) have a solid content of at least approximately 95%, in particular approximately 97%, a thickness of approximately 0.2 mm to 0.5 mm, in particular of approximately 0.3 mm to 0.4 mm, and/or a specific density of approximately 0.3 g/ml to 0.8 g/ml, in particular of approximately 0.4 g/ml to 0.7 g/ml.

Advantageously, the composite material according to the invention contains only a small concentration of volatile organic chemicals due to the absence of low-molecular blocking reagent. Conversely, the finished polyurethane layers of conventional polyurethane coatings based on diisocyanates blocked with 2-butanonoxime always contain residues of the blocking compound. This gives the product an offensive odor and also poses a health risk since 2-butanonoxime has toxicological properties. The composite structures according to the invention preferably contain polyurethane layers containing polyurethane according to formula (I) with a content of volatile organic chemicals (VOC) below approximately 100 ppm. The content of volatile organic chemicals is measured according to PB VWT 709 (Fresenius) by comparison with an external toluene standard.

For esthetic reasons, the composite material according to the invention is preferably provided with a grain, thereby giving the visual appearance of leather. For increasing the thermal resilience, the polyurethane coating can be stabilized with phenolic anti-oxidants. The resistance against UV radiation can be improved by using HALS (Hindered Aminic Light Stabilizers). Additional additives can include pigments, fillers, flame retardants as well as propellants for expanded intermediate layers.

A further object of the invention is to provide a method of manufacturing the aforedescribed composite structures. The method of the invention includes the following steps: a) one or several polyurethane layers are applied to a support having dehesive properties, wherein at least one of the polyurethane layers is formed by spreading onto the tape or onto a polyurethane coating, which is preformed on the tape, a reactive spreadable material capable of forming polyurethane and having a composition (A) which includes i) a polyole HO—$R^1$—OH with primary and/or secondary hydroxyl functional end groups, ii) a diisocyanate OCN—$R^2$—NCO and/or a diisocyanate pre-polymer OCN—$R^2$—NH—CO—O—$R^1$—O—CO—NH—$R^2$—NCO, wherein $R^1$ and $R^2$ independently represent an organic radical which comprises aliphatic, cyclo-aliphatic, aromatic and/or heterocyclic groups, and iii) which also includes a catalyst, and thermally hardening the spread compound; b) if desired, an adhesive layer is applied on the hardened polyurethane layer; c) a support layer, in particular a textile support layer, is applied on the side facing away from the tape, and d) the composite structure is, if necessary, removed from the tape after the adhesive to layer has hardened.

The process of the invention is preferably implemented as an inverse coating, i.e., the layer which forms the surface in the end product is deposited first on the tape. In a particularly preferred process, two polyurethane layers are applied, wherein the outer and/or the inner polyurethane layer is formed using a reactive spreadable material having the composition (A) and being capable of forming a polyurethane.

The process of the invention, like conventional processes, employs a catalyst. With the catalyst and the strong temperature dependence of the reaction rate, the manufacturing process becomes very flexible. Particularly preferred catalysts are metal acetyl acetonates, with nickel acetyl acetonates proven to be particularly suitable. Nickel acetyl acetonate attains a high catalytic activity at elevated temperatures (T>70° C.) (see equation (1)), so that the cross-linking reaction concludes already after approximately 2 minutes at a temperature of, for example, T=150° C.

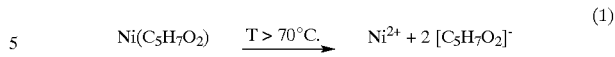

(1)

The catalysis is most likely caused by the freed $Ni^{2+}$ cation, assuming the mechanism depicted in equation (2).

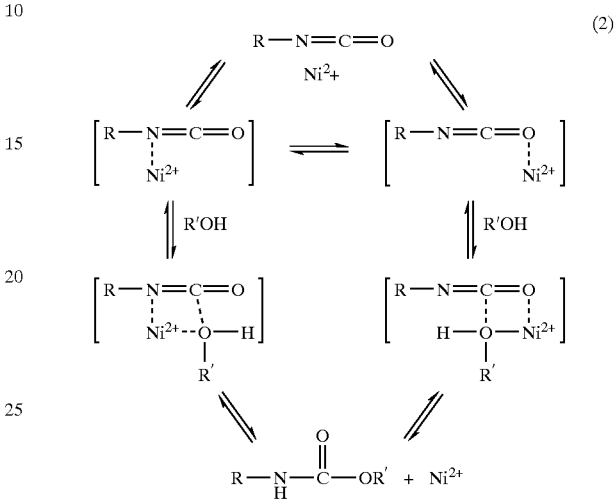

(2)

According to particularly preferred embodiments of the process of the invention, reactive spreadable materials capable of forming polyurethanes are used which have particularly advantageous properties for the manufacturing process. For example, the viscosity of the spreadable material is preferably in the range between approximately 1 Pa s and 20 Pa s, in particular between approximately 5 Pa s and 15 Pa s. The average shear forces can be estimated using equation (3).

$$SR = V_p/d \qquad (3)$$

SR=shear rate [$s^{-1}$], VP=production speed [m/s], d=blade gap [m]

Accordingly, a production speed of $V_p$=0.17 in/s (corresponding to 10 m/min) and a blade gap of d $4 \times 10^{-4}$ m results in a shear rate of SR=425 $s^{-1}$. According to this estimate, the material advantageously has at a shear force in the range of 200 $s^-$<SR<600 $s^{-1}$ a low speed, i.e., the material flows more easily. Hence, the spreadable material preferably has structural viscous properties. The system should have a sufficiently long open time (pot time) so that the spreadable material can be prepared and the paste subsequently processed. The pot time is defined as the time period during which the viscosity of the spreadable material is in a range suitable for subsequent processing, which for the process of the invention is in the range between approximately 1 Pa s and 20 Pa s. An open time of approximately 6 hours, in particular an open time longer than approximately 8 hours, is considered safe for production.

An important parameter for low-cost production is the production speed. The production speed depends strongly on the residence time required for the coating to thermally harden. The coating is preferably thermally hardened for approximately 0.1 minute to 4 minutes at approximately 100 to 180° C., and more preferably for approximately 90 s to 150 s at approximately 145 to 155° C.

Unlike PVC laminates to which a grain structure can be applied thermally, polyurethanes are difficult to emboss due to their elastomeric characteristic properties. A fine grain can therefore be produced only by inverse coating onto a support having the negative of the grain. The support used with the process of the invention has dehesive characteristics and carries the negative (inverse) pattern of the desired grain. Cross-linked polyurethane raw materials can be employed with transfer coatings, so that thermally and mechanically stable form bodies can be produced.

The composite structure of the invention has several advantages, making it particularly suitable as imitation leather or expanded foil. Since a large number of different educts can be used as building blocks, product with a wide range of properties can be produced and optimally adapted to different applications. Advantageously, the educts are also less expensive than conventional educts (which are derived using blocking reagents). Since the reactivity of the employed spreadable materials can be varied by using the catalyst, additional costs savings are achieved by greater flexibility in the production process. The properties of the product of the invention, in particular with respect to odor and content of volatile organic chemicals, are improved by eliminating educts derived with blocking reagents.

The invention will now be described in more detail with reference to examples.

EXAMPLE 1

A composite material according to the invention was produced using a reactive spreadable material capable of forming a polyurethane and having the following composition:

500 g poly(oxypropylene)triol (molecular weight 6000)
610 g poly(oxypropylene)diol (molecular weight 4000)
400 g MDI (methylendiphenyl-diisocyanate oligomer) (molecular weight 1200)
10 g nickel acetylacetonate 10% in poly(oxypropylene) glycol The reactive spreadable material was applied onto a substrate having a dehesive surface immediately after mixing using a knife-over-roll coater. Prior to the application, a conventional solvent polyurethane coating process was used to apply a polyurethane cover layer to the support. The substrate with the dehesive surface subsequently passed through a hot air furnace. The reactive spreadable material completely polymerized by heating for 70 seconds to 150° C. An adhesive layer was applied onto the hardened polyurethane layer. A textile carrier was laminated in the still wet adhesive layer using a laminating machine. The coated textile was subsequently separated from the support having the dehesive surface.

EXAMPLE 2 (COMPARATIVE EXAMPLE)

For comparative purposes, a composite structure was produced using a commercially available spreadable material capable of forming a polyurethane and containing 2-butanonoxim-blocked diisocyanates. The reactive spreadable material had the following composition:

500 g Impranil HS62® (2-butanonoxim-blocked prepolymer)
500 g Impranil HS-80® (2-butanonoxim-blocked prepolymer)
71 g Imprafix HSC® (cyclo-aliphatic diamine, cross-linker)
10 g Levacast Fluid SW® (auxiliary product for processing)

The reactive spreadable material was also processed into a composite structure. Processing was identical to that of example 1, except that the reactive spreadable material was hardened for 2 minutes at 150° C.

The following tables compare the characteristic properties of the reactive spreadable mater ial, the manufacturing characteristics and the properties of the finished composite material produced in example 1 and 2 (comparative example):

TABLE 1 properties of the reactive spreadable materials

| Property | Example 1 | Example 2 (Comparative Example) |
|---|---|---|
| Cross-linker | oligomer diisocyanate | cyclo-aliphatic diamines |
| Pot time ("open time") | approx. 10 h | approx. 24 h |
| Solvent contents | approx. 5% | approx. 10% |
| Variability | large raw material building block | limited by "ready to use" raw materials (few prepolymers) |
| Toxicity | no carcinogenic materials | contains free carcinogenic 2-butanonoxim |

TABLE 2 production properties

| Property | Example 1 | Example 2 (Comparative Example) |
|---|---|---|
| Reaction time | 70 s | fixed (approx. 2 min @ 150° C.), no catalysis |
| Manufacturing temperature | 150° C., increase in reaction speed possible through temperature → increased productivity | 150° C., increase in reaction speed through temperature not possible |

TABLE 3 production properties

| Property | Example 1 | Example 2 (Comparative Example) |
|---|---|---|
| Emissions (Fresenius Test Method PB VWT 709) | VOC approx. 80 ppm, no dangerous substances | VOX approx. 180 ppm, traces of carcinogenic |
| Mechanical properties | almost identical for both systems | |
| Aging properties | almost identical for both systems | |

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A composite structure with at least one polyurethane layer, a support layer, and an optional adhesive layer placed between these layers, wherein at least one polyurethane layer contains a polyurethane having the formula (I)

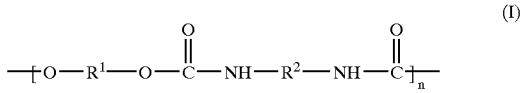

wherein O—R¹—O is the radical of a polyol selected from the group consisting of polyether polyols and a polyester polyols, wherein the polyether polyols and polyester polyols have hydroxyl functional end groups selected from the group consisting of primary and secondary hydroxyl functional end groups and in which the primary and secondary hydroxyl functional groups of the polyols have a ratio of between approximately 2:1 and 1:6, wherein R¹ and R² independently represent an organic radical which includes aliphatic, cyclo-aliphatic, aromatic and/or heterocyclic groups and n is an integer number between 1 and 50,000 wherein the polyurethane layer(s) which contain(s) the polyurethane according to formula (1) have/has a content of volatile organic chemicals (VOC) below approximately 100 ppm and wherein the composite structure has a grain.

2. The composite structure according to claim 1, wherein the at least one polyurethane layer comprises two polyurethane layers and wherein the outer and/or the inner polyurethane layer includes a polyurethane of the formula (I).

3. The composite structure according to claim 2, wherein the polyol has a molecular weight from approximately 2000 to approximately 12,000.

4. The composite structure according to claim 1, wherein the polyether glycol is a poly-(oxypropylene)glycol and the polyester glycol comprises glycols of dimeric fatty acids.

5. The composite structure according to claim 1, wherein the polyurethane of formula (I) comprises bi-functional and tri-functional polyols.

6. The composite structure according to claim 5, wherein the ratio of the bi-functional polyols to the tri-functional polyols is between approximately 1:2 and approximately 5:1.

7. The composite structure according to claim 6, wherein the radical R² is based on isophorone diisocyanate and/or hexamethylene diisocyanate.

8. The composite structure according to claim 1, wherein the radical R² is based on diphenylmethane diisocyanate and/or tolylene diisocyanate.

9. The composite structure according to claim 1, wherein the polyurethane layer(s) which contain(s) the polyurethane according to formula (I), have/has a solid content of at least approximately 95%.

10. The composite structure according to claim 1, wherein the polyurethane layer(s) which contain(s) the polyurethane according to formula (I), have/has a thickness of approximately 0.2 mm to 0.5 mm.

11. The composite structure according to claim 1, wherein the polyurethane layer(s) which contain(s) the polyurethane according to formula (I), have/has a density of approximately 0.3 g/ml to 0.8 g/ml.

12. The composite structure according to claim 1, wherein the support layer is a textile layer.

13. The composite structure according to claim 1, wherein the support layer is made of PVC.

14. The composite structure according to claim 1, wherein the support layer is made of polyolefin.

15. The composite structure according to claim 1, wherein the support layer is made of polyurethane foam.

* * * * *